(12) United States Patent
Thomas

(10) Patent No.: US 7,366,522 B2
(45) Date of Patent: Apr. 29, 2008

(54) METHOD AND SYSTEM FOR LOCATION TRACKING

(76) Inventor: C. Douglass Thomas, 1193 Capri Dr., Campbell, CA (US) 95008

( * ) Notice: Subject to any disclaimer, the term of this patent is extended or adjusted under 35 U.S.C. 154(b) by 272 days.

(21) Appl. No.: 09/797,517

(22) Filed: Feb. 28, 2001

(65) Prior Publication Data

US 2003/0060212 A1      Mar. 27, 2003

Related U.S. Application Data

(60) Provisional application No. 60/185,480, filed on Feb. 28, 2000.

(51) Int. Cl.
*H04Q 7/20* (2006.01)

(52) U.S. Cl. ................ 455/456.1; 455/404.2; 455/414.2; 455/440; 340/539.13; 340/825.49; 340/988; 342/357.01; 342/457; 701/213

(58) Field of Classification Search .......... 455/440, 455/456.1, 456.2, 456.3, 404.2, 414.2, 457; 340/539.13, 825.49, 988; 701/213, 214, 701/215; 342/357.06, 357.07, 357.01, 357.13, 342/457

See application file for complete search history.

(56) References Cited

U.S. PATENT DOCUMENTS

| | | | |
|---|---|---|---|
| 5,389,934 A | 2/1995 | Kass | |
| 5,400,020 A | 3/1995 | Jones et al. | |
| 5,461,365 A | 10/1995 | Schlager et al. | |
| 5,491,486 A | 2/1996 | Welles, II et al. | |
| 5,512,902 A | 4/1996 | Guthrie et al. | |
| 5,515,858 A | 5/1996 | Myllymaki | |
| 5,528,247 A * | 6/1996 | Nonami ................ 342/357.1 |
| 5,528,518 A | 6/1996 | Bradshaw et al. | |
| 5,539,748 A | 7/1996 | Raith | |
| 5,541,845 A | 7/1996 | Klein | |
| 5,550,551 A * | 8/1996 | Alesio .................. 342/457 |
| 5,568,119 A | 10/1996 | Schipper et al. | |
| 5,570,412 A | 10/1996 | LeBlanc | |
| 5,576,716 A | 11/1996 | Sadler | |
| 5,592,173 A | 1/1997 | Lau et al. | |
| 5,623,260 A | 4/1997 | Jones | |
| 5,629,678 A | 5/1997 | Gargano et al. | |
| 5,652,570 A | 7/1997 | Lepkofker | |
| 5,673,692 A | 10/1997 | Schulze et al. | |

(Continued)

FOREIGN PATENT DOCUMENTS

EP      0 874 529 A2     10/1998

(Continued)

OTHER PUBLICATIONS

J.Wrolstad, "Chrysler Claims First With Bluetooth Mobile Phone System," Wireless Newsfactor, Oct. 26, 2001.

(Continued)

*Primary Examiner*—Nghi H. Ly

(57) ABSTRACT

Techniques for location tracking, location utilization, and dissemination and management of location information are disclosed. As a location monitoring system, one embodiment includes at least a plurality of mobile computing devices supported by a wireless network, and a web server coupled to a wired network (e.g., the Internet) that couples to the wireless network. Each of the mobile computing devices are associated with and proximate to an object whose location is being monitored. The web server stores the locations of each of the mobile computing devices or the objects proximate thereto, and enables only authorized users to obtain access the locations via the wired network.

20 Claims, 8 Drawing Sheets

U.S. PATENT DOCUMENTS

| | | | | |
|---|---|---|---|---|
| 5,710,551 | A | 1/1998 | Ridgeway | |
| 5,712,619 | A | 1/1998 | Simkin | |
| 5,731,757 | A | 3/1998 | Layson et al. | |
| 5,731,788 | A | 3/1998 | Reeds | |
| 5,742,233 | A | 4/1998 | Hoffman et al. | |
| 5,751,245 | A | 5/1998 | Janky et al. | |
| 5,771,001 | A | 6/1998 | Cobb | |
| 5,774,876 | A | 6/1998 | Woolley et al. | |
| 5,797,091 | A | 8/1998 | Clise et al. | |
| RE35,920 | E | 10/1998 | Sorden et al. | |
| 5,826,195 | A | 10/1998 | Westerlage et al. | |
| 5,835,907 | A | 11/1998 | Newman | |
| 5,841,352 | A | 11/1998 | Prakash | |
| 5,844,862 | A | 12/1998 | Cocatre-Zilgien | |
| 5,850,196 | A | 12/1998 | Mowers | |
| 5,889,770 | A * | 3/1999 | Jokiaho et al. | 370/337 |
| 5,948,043 | A | 9/1999 | Mathis | |
| 5,959,575 | A | 9/1999 | Abbott | |
| 5,959,577 | A * | 9/1999 | Fan et al. | 342/357.13 |
| 5,963,130 | A | 10/1999 | Schlager et al. | |
| 5,970,388 | A | 10/1999 | Will | |
| 5,995,849 | A | 11/1999 | Williams et al. | |
| 6,002,363 | A | 12/1999 | Krasner | |
| 6,002,982 | A | 12/1999 | Fry | |
| 6,009,319 | A | 12/1999 | Khullar et al. | |
| 6,013,007 | A | 1/2000 | Root et al. | |
| 6,014,080 | A | 1/2000 | Layson, Jr. | |
| 6,014,090 | A | 1/2000 | Rosen et al. | |
| 6,023,241 | A | 2/2000 | Clapper | |
| 6,032,051 | A | 2/2000 | Hall et al. | |
| 6,034,622 | A * | 3/2000 | Levine | 340/573.4 |
| 6,054,928 | A * | 4/2000 | Lemelson et al. | 340/573.4 |
| 6,064,336 | A | 5/2000 | Krasner | |
| 6,067,018 | A * | 5/2000 | Skelton et al. | 340/573.3 |
| 6,067,044 | A | 5/2000 | Whelan et al. | |
| 6,072,396 | A | 6/2000 | Gaukel | |
| 6,078,290 | A | 6/2000 | McBurney et al. | |
| 6,083,248 | A | 7/2000 | Thompson | |
| 6,083,353 | A | 7/2000 | Alexander | |
| 6,094,168 | A * | 7/2000 | Duffett-Smith et al. | 342/463 |
| 6,100,806 | A | 8/2000 | Gaukel | |
| 6,131,067 | A | 10/2000 | Girerd et al. | |
| 6,141,570 | A | 10/2000 | O'Neill, Jr. et al. | |
| 6,144,303 | A * | 11/2000 | Federman | 340/573.4 |
| 6,148,280 | A | 11/2000 | Kramer | |
| 6,163,696 | A * | 12/2000 | Bi et al. | 455/436 |
| 6,171,264 | B1 | 1/2001 | Bader | |
| 6,172,640 | B1 | 1/2001 | Durst et al. | |
| 6,175,616 | B1 | 1/2001 | Light et al. | |
| 6,198,390 | B1 | 3/2001 | Schlager et al. | |
| 6,198,431 | B1 | 3/2001 | Gibson | |
| 6,198,930 | B1 | 3/2001 | Schipper | |
| 6,199,045 | B1 | 3/2001 | Giniger et al. | |
| 6,226,622 | B1 | 5/2001 | Dabbiere | |
| 6,231,519 | B1 | 5/2001 | Blants et al. | |
| 6,232,916 | B1 | 5/2001 | Grillo et al. | |
| 6,236,358 | B1 | 5/2001 | Durst | |
| 6,238,337 | B1 | 5/2001 | Kambhatla et al. | |
| 6,243,039 | B1 | 6/2001 | Elliot | |
| 6,243,660 | B1 | 6/2001 | Hsu et al. | |
| 6,246,376 | B1 | 6/2001 | Bork et al. | |
| 6,263,280 | B1 * | 7/2001 | Stingone, Jr. | 701/213 |
| 6,278,936 | B1 | 8/2001 | Jones | |
| 6,282,362 | B1 | 8/2001 | Murphy et al. | |
| 6,292,687 | B1 | 9/2001 | Lowell et al. | |
| 6,298,306 | B1 | 10/2001 | Suarez et al. | |
| 6,300,875 | B1 | 10/2001 | Schafer | |
| 6,302,844 | B1 | 10/2001 | Walker et al. | |
| 6,314,308 | B1 | 11/2001 | Sheynblat et al. | |
| 6,317,049 | B1 | 11/2001 | Toubia et al. | |
| 6,323,807 | B1 | 11/2001 | Golding et al. | |
| 6,324,213 | B1 | 11/2001 | Harrison | |
| 6,327,533 | B1 | 12/2001 | Chou | |
| 6,331,817 | B1 | 12/2001 | Goldberg | |
| 6,339,397 | B1 | 1/2002 | Baker | |
| 6,340,928 | B1 | 1/2002 | McCurdy | |
| 6,349,257 | B1 | 2/2002 | Liu et al. | |
| 6,353,390 | B1 | 3/2002 | Beri et al. | |
| 6,353,798 | B1 | 3/2002 | Green et al. | |
| 6,356,841 | B1 | 3/2002 | Hamrick et al. | |
| 6,362,778 | B2 | 3/2002 | Neher | |
| 6,363,254 | B1 * | 3/2002 | Jones et al. | 455/456.1 |
| 6,363,323 | B1 | 3/2002 | Jones | |
| 6,377,810 | B1 * | 4/2002 | Geiger et al. | 455/456.2 |
| 6,388,612 | B1 | 5/2002 | Neher | |
| 6,404,352 | B1 | 6/2002 | Ichikawa et al. | |
| 6,407,698 | B1 | 6/2002 | Ayed | |
| 6,411,892 | B1 | 6/2002 | Van Diggelen | |
| 6,411,899 | B2 | 6/2002 | Dussell et al. | |
| 6,421,538 | B1 | 7/2002 | Byrne | |
| 6,426,719 | B1 | 7/2002 | Nagareda et al. | |
| 6,427,120 | B1 | 7/2002 | Garin et al. | |
| 6,430,602 | B1 | 8/2002 | Kay et al. | |
| 6,433,732 | B1 | 8/2002 | Dutta et al. | |
| 6,441,778 | B1 | 8/2002 | Durst et al. | |
| 6,442,380 | B1 | 8/2002 | Mohlndra | |
| 6,443,890 | B1 | 9/2002 | Schulze et al. | |
| 6,445,937 | B1 | 9/2002 | daSilva | |
| 6,453,237 | B1 | 9/2002 | Fuchs et al. | |
| 6,469,639 | B2 | 10/2002 | Tanenhaus et al. | |
| 6,471,087 | B1 | 10/2002 | Shusterman | |
| 6,478,736 | B1 | 11/2002 | Mault | |
| 6,513,532 | B2 | 2/2003 | Mault et al. | |
| 6,522,871 | B1 | 2/2003 | Patrick et al. | |
| 6,522,889 | B1 * | 2/2003 | Aarnio | 455/456.5 |
| 6,529,164 | B1 * | 3/2003 | Carter | 342/463 |
| 6,544,193 | B2 | 4/2003 | Abreu | |
| 6,552,652 | B2 | 4/2003 | Beken | |
| 6,559,620 | B2 | 5/2003 | Zhou et al. | |
| 6,569,094 | B2 | 5/2003 | Suzuki et al. | |
| 6,579,231 | B1 | 6/2003 | Phipps | |
| 6,625,437 | B1 * | 9/2003 | Jampolsky et al. | 455/405 |
| 6,640,085 | B1 | 10/2003 | Chatzipetros et al. | |
| 6,650,907 | B1 | 11/2003 | Kamperschroer et al. | |
| 6,665,534 | B1 | 12/2003 | Conklin et al. | |
| 6,721,542 | B1 | 4/2004 | Anttila et al. | |
| 6,747,675 | B1 | 6/2004 | Abbott et al. | |
| 6,804,606 | B2 | 10/2004 | Jones | |
| 6,847,892 | B2 | 1/2005 | Zhou et al. | |
| 6,856,804 | B1 | 2/2005 | Ciotta | |
| 6,865,385 | B1 | 3/2005 | Kohde et al. | |
| 6,952,645 | B1 * | 10/2005 | Jones | 701/201 |
| 6,975,941 | B1 | 12/2005 | Lau et al. | |
| 7,085,253 | B2 | 8/2006 | Yang | |
| 7,136,832 | B2 | 11/2006 | Li et al. | |
| 7,253,731 | B2 | 8/2007 | Joao | |
| 2001/0006891 | A1 | 7/2001 | Cho | |
| 2001/0020204 | A1 | 9/2001 | Runyon et al. | |
| 2001/0028304 | A1 | 10/2001 | I'Anson et al. | |
| 2001/0044299 | A1 | 11/2001 | Sandegren | |
| 2001/0052849 | A1 | 12/2001 | Jones, Jr. | |
| 2002/0000930 | A1 | 1/2002 | Crowson et al. | |
| 2002/0027507 | A1 | 3/2002 | Yarin et al. | |
| 2002/0038182 | A1 | 3/2002 | Wong et al. | |
| 2002/0050945 | A1 | 5/2002 | Tsukishima et al. | |
| 2002/0057192 | A1 | 5/2002 | Eagleson et al. | |
| 2002/0063622 | A1 | 5/2002 | Armstrong et al. | |
| 2002/0077080 | A1 | 6/2002 | Greene | |
| 2002/0087260 | A1 | 7/2002 | Hancock et al. | |
| 2002/0087619 | A1 | 7/2002 | Tripathi | |
| 2002/0111171 | A1 | 8/2002 | Boesch et al. | |
| 2002/0111819 | A1 | 8/2002 | Li et al. | |
| 2002/0115453 | A1 | 8/2002 | Poulin et al. | |
| 2002/0119789 | A1 | 8/2002 | Friedman | |

| | | | |
|---|---|---|---|
| 2002/0193121 A1 | 12/2002 | Nowak et al. | |
| 2003/0003943 A1 | 1/2003 | Bajikar | |
| 2003/0009410 A1 | 1/2003 | Ramankutty et al. | |
| 2003/0013445 A1 | 1/2003 | Fujiwara et al. | |
| 2003/0069759 A1 | 4/2003 | Smith | |
| 2003/0151507 A1 | 8/2003 | Andre et al. | |
| 2004/0034470 A1 | 2/2004 | Workman | |
| 2004/0046637 A1 | 3/2004 | Wesby Van Swaay | |
| 2004/0114731 A1 | 6/2004 | Gillett et al. | |
| 2004/0117108 A1 | 6/2004 | Nemeth | |
| 2006/0173444 A1 | 8/2006 | Choy et al. | |

FOREIGN PATENT DOCUMENTS

| | | |
|---|---|---|
| EP | 1 037 447 A2 | 9/2000 |
| WO | WO 97/41654 | 11/1997 |
| WO | WO 98/07169 A1 | 1/1998 |
| WO | WO 98/16045 | 4/1998 |
| WO | WO 00/51391 | 8/2000 |
| WO | WO 01/45343 A2 | 6/2001 |
| WO | WO 01/50151 A1 | 7/2001 |
| WO | WO 02/42979 A1 | 5/2002 |
| WO | WO 02/084618 A1 | 10/2002 |
| WO | WO 03/012720 A1 | 2/2003 |

OTHER PUBLICATIONS

K. Miyake, "Sharp to unveil 3G PDA-type cell phone," ITworld. com, Inc., Jan. 11, 2002.
"Wherify Wireless and SiRF Team to Delivery Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless Location Services," Wherify Wireless, Inc., webpages, pp. 1-5 (downloaded: Mar. 25, 2003: www.wherifywireless.com/prod_watches.htm).
Marek, "The Unstoppable SnapTrack," Wireless Week, Dec. 18, 2000.
Rabinowitz and Spilker, Jr., "Positioning Using the ATSC Digital Television Signal," Rosum Corporation Whitepaper, Rosum Corporation (downloaded May 21, 2003).
Rabinowitz and Spilker, Jr., "A New Positioning System Using Television Synchronization Signals," Rosum Corporation, pp. 1-11 (downloaded May 21, 2003).
"Trimble and Rosum Team to Develop Universal Positioning Technology," Trimble Navigation, Inc., News Release, Feb. 27, 2003.
Wong, "Fishers, golfers join the rush to GPS," San Jose Mercury News, news article, Mar. 25, 2002.
Ryan, "Catching up with Dick Tracy," San Francisco Chronicle, news article, Mar. 18, 2002.
"Theme Park Visitors & Cashless Purchasing," Case Study, RJI Incorporated, webpages, pp. 1-2 (downloaded Mar. 16, 2002: www.rji.cc/casestudies/themepark.html).
"Ski Rental with Auto ID and Tracking," Case Study, RJI Incorporated, webpages, pp. 1-2 (downloaded Mar. 16, 2002: www.rji.cc/casestudies/skirentalcompany.html).
"Real-Time Warehouse Tracking," Case Study, RJI Incorporated, webpages, pp. 1-2 (downloaded Mar. 16, 2002: www.rji.cc/casestudies/rtwarehousetracking.html).
"Frozen Food Warehouse," Case Study, RJI Incorporated, webpages, pp. 1-3 (downloaded Mar. 16, 2002: www.rji.cc/casestudies/frozenfoodwarehouse.html).
"Airline Cargo Containers," Case Study, RJI Incorporated, webpages, pp. 1-2 (downloaded Mar. 16, 2002: www.rji.cc/casestudies/airlinecargocontainers.html).
"Airline Food Carts," Case Study, RJI Incorporated, webpages, pp. 1-2 (downloaded Mar. 16, 2002: www.rji.cc/casestudies/airlinefoodcarts.html).
"Real Time Location System (RTLS)," Case Study, RJI Incorporated, webpage, p. 1 (downloaded Mar. 16, 2002: www.rji.cc/technology/rtls.html).
"GLS Communicator," SkyBitz, webpages, pp. 1-2, (downloaded Nov. 15, 2002: www.skybitz.com/gls/communicator.html).
"Global Locating Services." SkyBitz, webpage, p. 1,(downloaded Nov. 15, 2002: www.skybitz.com/services/gls.html).
F. Rivera, "Special Report: Keeping Tabs on Your Teen," 7 News, Boston, Apr. 30, 2002, pp. 1-3.
GPS2000, Omega Research and Development, Inc., webpages, pp. 1-9 (pp. 7-9 pertain to an online tour) (downloaded Jul. 14, 2003: www.gps2000online.com/).
"Track Your FedEx Shipments via Email," FedEx, webpages, pp. 1-2 (downloaded Oct. 29, 2002: www.fedex.com).
"Track Shipments—Detailed Results," FedEx, webpages, pp. 1-2 (downloaded Oct. 29, 2002: www.fedex.com).
FedEx Insight, FedEx, webpages, pp. 1-11 (downloaded Oct. 29, 2002: www.fedex.com).
"Tracking Helpful Tips," United Parcel Service of America, Inc. (UPS), webpages, pp. 1-2 (downloaded Jun. 1, 2002: www.ups.com/tracking/nm_help.html).
"My UPS.COM Benefits," United Parcel Service of America, Inc. (UPS), webpage, p. 1 (downloaded Apr. 13, 2002: www.ups.com/myupsinfo/info/benefits?pnav=stdsservice).
"Enhanced Tracking," United Parcel Service of America, Inc. (UPS), webpages, pp. 1-2 (downloaded Jun. 1, 2002: www.ups.com/myupsinfo/info/etrack?pnav=stdservice).
"UPS Package Tracking," United Parcel Service of America, Inc. (UPS), webpages, pp. 1-2 (downloaded Apr. 13, 2002: www.ups.com/tracking/tracking.html).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
Crossbow Product Guide—Accelerometers, Crossbow Technology, Inc., webpages, pp. 1-3 (downloaded Apr. 11, 2002: www.xbow.com/Products/Accelerometers.htm).
Accelerometers—General Purpose, LP Series, Crossbow Technology, Inc., data sheet, pp. 1-3 (downloaded Apr. 11, 2002: www.xbow.com/Products/Accelerometers.htm).
Precision Accelerometers, PCB Piezoelectronics Products—SVS Division, webpages, pp. 1-2 (downloaded Apr. 11, 2002: www.pcb.com/products/svs/index.html).
"352C22 Miniature Low Profile ICP Accelerometer," Precision Accelerometers, PCB Piezoelectronics Products—SVS Division, webpages, pp. 1-2 (downloaded Apr. 11, 2002: www.pcb.com/products/svs/svs352c22.html).
K. Hill, "Prada Uses Smart Tags To Personalize Shopping," CRMDaily.com, Apr. 24, 2002., pp. 1-4.
"Savi Reusable Transport Container," Savi Technology, Inc., Apr. 30, 2002, pp. 1-2.
"Developing a GPSs for the Global Supply Chain," Aberdeen Group, Inc., Executive White Paper, Jun. 2002.
Appenzeller, et al., "The Mobile People Architecture", Technical Report: CSL-TR-00000, Computer Systems Laboratory, Departments of Electrical Engineering and Computer Science, Stanford University, Jan. 1999, pp. 1-13.
Calsyn, Martin and Desseault, Lisa, "Presence Information Protocol Requirements," Internet Draft, Feb. 9, 1998, pp. 1-27.
J. Rosenberg, H. Schulzrinne, Internet Draft, "SIP For Presence," http://www.alternic.org/drafts/drafts-r-s/draft-rosenberg=sip-pip-00.txt, Nov. 13, 1998, Bell Laboratories, Columbia, pp. 1-31.
Motorola Consumer Catalog: Pagers (webpage), Motorola, Inc., downloaded Jan. 19, 2000.
SnapTrack in Action (webpage), SnapTrack Inc., downloaded Jan. 19, 2000.
SnapTrack—Technology At Work (webpage), SnapTrack Inc., downloaded Jan. 19, 2000.
SnapTrack—Privacy Protection (webpage), SnapTrack Inc., downloaded Jan. 19, 2000.
"An Introduction to SnapTrack Server-Aided GPS Technology," SnapTrack Inc., no date.
"SnapTrack and SignalSoft Corp. Team Up to Trial Location-based Information Services for GSM Test Group," Press Release, SnapTrack Inc., Dec. 6, 1999.
"SnapTrack Awarded Additional Key Patents for Enhanced GPS System," Press Release, SnapTrack Inc., Jan. 4, 2000.
TruePosition Virtual Brochure (webpage), TruePosition, Inc., no date.

"Carrier and end-user applications for wireless location systems," TruePosition, Inc., pp. 1-7, no date.

Stilp, Louis A., "Examining the Coming Revolution in Location Services," pp. 1-11, no date.

Commercial Uses for LoJack (webpage), LoJack Corporation, downloaded Jan. 22, 2000.

Chertkoff, Rachel, "Vehicle Locator Systems," Paper Technology, pp. 1-2, 1998.

"EarthTrack™ Vehicle Tracking Systems," Outfitter Satellite, Inc., 1998 (downloaded Jan. 22, 2000).

Kleinknecht, William, "Juvenile authorities want satellite tracking for felons," The Star-Ledger of New Jersey, Nov. 18, 1997.

"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).

"Start-up crams single chip with phone, GPS and Bluetooth," CNET Network, Inc. (ZDNET), Mar. 22, 2002 (downloaded: http://news.zdnet.co.uk/story/0,1284-x2107163,00.html).

Smart Antenna, Specification sheet by Axiom Naviagation Inc. (www.axiomnav.com), no date.

Swift B2 GPS Receiver, Specification sheet by Axiom Navigation Inc. (www.axiomnav.com), no date.

Swift A2 GPS Receiver, Specification sheet by Axiom Navigation Inc. (www.axiomnav.com), no date.

SandPiper GPS Receiver, Specification sheet by Axiom Navigation Inc. (www.axiomnav.com), no date.

"Fleet Management Systems-Asset Tracking Devices," Axiom Navigation Inc., 2000-2001 (downloaded Oct. 19, 2002: www.axiomnav.com/Prod_System/prod_system.asp).

"Global Cell Phone Location," Axiom Navigation Inc., 2000-2001 (downloaded Oct. 19, 2002: www.axiomnav.com/Prod_Global/prod_global.asp).

"X-GPS™—Hybrid GPS Location Server Solution," Axiom Navigation Inc., 2000-2001 (downloaded Oct. 19, 2002: www.axiomnav.com/Prod_Global/x-gps.asp).

"Digital/Analog Compass Sensors" and "1655 Digital Compass Sensor," webpages, The Robson Company, Inc., pp. 1-2 (downloaded Apr. 11, 2002: www.dinsmoresensors.com/index.html).

Delphi and MobileAria Demonstrate True Hands Free In-Vehicle Mobile Productivity Services At CES, Press Release, Delphia Automotive Systems, Jan. 8, 2002 (downloaded Apr. 5, 2002: www.delphiauto.com/news/pressRelease/pr6828-01082002).

"NavMate® Navigation System," Visteon Corporation, webpage, pp. 1-2 (downloaded Jun. 21, 2002: www.visteon.com/technology/automotive/navmate.html).

"Danger -Products" and "Hiphop Communicator Brochure," Danger, Inc., downloaded Oct. 26, 2003: www.danger.com/products.php).

"MMS phones: Don't believe the hype," CNN.com/SCI-TECH, Aug. 8, 2002, pp. 1-3.

"What is "3G" technology?," CNN.com/SCI-TECH, Oct. 22, 2001, pp. 1-3.

"Devices for Text Messages in Deutsche Telekom's fixed network have already found their way into many households," Deutsche Telekom AG, Press Release, Mar. 13, 2002, pp. 1-2.

"FunMail Launches on the NTT DoCoMo i-mode network," FunMail, Press Release, May 1, 2001, pp. 1-2.

"Send images to i-mode phones," Mobile Media Japan, 2001, pp. 1-3.

"Introduction to SMS," by C. Tull of Anywhere YouGo.com, pp. 1-4 (downloaded: www.devx.com/wireless/articles/SMS/SMSintro-asp), no date.

"The Always on Network," Position Paper, Nortel Networks, 2002.

"Mobile Location Based Services: Cell Tracking Devices of People & Thongs . . . ," pp. 1-2, (downloaded Aug. 10, 2002: http://3glocate.com).

"3G Mobile Internet Revolution, . . . only with Location Based Services!" pp. 1, (downloaded Aug. 10, 2002: http://webhome.idirect.com/~dental/3glocator/home.htm).

"What are Instant Messages?" Yahoo! Messenger Help, Yahoo! Inc., 2002, pp. 1.

"What is a Friend List?" Yahoo! Messenger Help, Yahoo! Inc., 2002, pp. 1.

"Status Icons/Messages," Yahoo! Messenger Help, Yahoo! Inc., 2002, pp. 1-2.

"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html (through /tour9.html)).

IMVironment, Yahoo! Meseanger, Yahoo! Inc., 2002, pp. 1-12 (downloaded (including) Oct. 27, 2002: http://help.yahoo.com/help/us/mesg/imv/imv-01.html (through /index5.html).

"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).

"Yahoo! Messenger—Sending Messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html (through /tour7.html)).

LoadTrak, pp. 1-2 (downloaded Jun. 4, 2002: www.load-trak.com).

"pulver.com's Location Based Services Report," pulver.com, Inc., Oct. 2001, pp. 1-17 (downloaded Jun. 4, 2002: www.pulver.com/lbsreport/lastbsreport.02/oct01.txt).

"Wherify Wireless GPS Locator for Kids User Guide," Wherify Wireless, Inc., 2003, pp. 1-106.

"Radio Frequency Identification (RFID)," Case Study, RJI Incorporated, webpage, p. 1 (downloaded Mar. 16, 2002: www.rji.cc/technology/rfid.html).

"MoniTrack," Case Study, RJI Incorporated, webpages, pp. 1-2 (downloaded Mar. 16, 2002: www.rji.cc/technology/telematic.html).

"Parkwatch and Wherenet Unveil the First Amusement Visitor Locating System," Park Watch, Press Release, Jun. 27, 2000.

Real Time Locating System, Executive Summary, Technology Systems International, Inc., no date.

"Locate Networks: Our Service," Locate Networks, webpages, pp. 1-7 (downloaded Sep. 26, 2002: www.locatenetworks.com/).

"Technical Applications Of Our Current Technology," Aetherwire, webpages, pp. 1-4 (downloaded Mar. 16, 2002: www.aetherwire.com/CDROM/General/appl1.html).

Bickers, "Eyes in the sky," SafeTzone Technology Corporation, webpages, 2001, pp. 1-3 (downloaded: www.safetzone.com/newsKiosk.asp).

"IO Data Develops GPS Adapter for 1-Mode Mobile," AsiaBizTech, Sep. 17, 2002, pp. 1-2.

"Pakhound: Your Watchdog In The Shipping Industry," website pages, pp. 1-3 (downloaded Jun. 9, 2002: www.pakhound.com/fact.asp).

"Guide to Tracking Info.," Nippon Express, website page, p. 1 (downloaded Jun. 9, 2002: www.nittsu.co.ip/edoc/howtoe.htm).

My.Roadway!, Roadway Express, Inc., webpages, pp. 1-2, (downloaded Jun. 9, 2002: www.quiktrak.roadway.com/cgi-bin/quiktrak).

Packtrack™, PackTrack.com, webpages, pp. 1-2 (downloaded Jun. 9, 2002: www.packtrack.com).

"Welcome to Traker Systems," Tracker Systems, webpages, pp. 1-2 (downloaded Jun. 9, 2002: www.trakersystems.com).

"Welcome to Iship, Inc.," iShip, Inc., webpages, pp. 1-2, (downloaded Jun. 9, 2002: www.iship.com/).

"Turning Position Into Knowledge," SkyBitz, webpage, p. 1, (downloaded Nov. 15, 2002: www.skybitz.com).

"News," SkyBitz, webpages, pp. 1-8, (downloaded Nov. 15, 2002: www.skybitz.com/about/news.html).

* cited by examiner

500

| MD | USER | SUPERVISOR | PASSWORD | LOGGED_IN |
|----|------|------------|----------|-----------|
| 1  | John | Barb       | 1234     | 1         |
| 2  | Jane | Bill       | 5678     | 0         |

| MD | CURRENT LOCATION | PREVIOUS LOCATION |
|----|------------------|-------------------|
| 1  | XXX              | YYY               |
| 2  | WWW              | ZZZ               |

FIG. 5B

METHOD AND SYSTEM FOR LOCATION TRACKING

CROSS-REFERENCE TO RELATED APPLICATION

This application claims the benefit of U.S. Provisional Patent Application No. 60/185,480, filed Feb. 28, 2000, and entitled "METHOD AND SYSTEM FOR LOCATION TRACKING", and which is hereby incorporated by reference herein.

BACKGROUND OF THE INVENTION

1. Field of the Invention

The present invention relates to computing or communication devices and, more particularly, to location tracking of computing or communication devices.

2. Description of the Related Art

Today, various types of or computing devices having communication capabilities (e.g., wireless communication devices) are available. Examples of computing devices having communication capabilities include pagers, mobile phones, personal digital assistants (PDAs), palm-top computers, and electronic schedulers.

Recently, computing devices have been able to detect their location though Global Positioning Satellites (GPS) or with the assistance of a network (e.g., cellular network). As an example, U.S. Pat. No. 5,959,557 describes a system in which a GPS receiver is used to measure a position of a mobile unit (i.e., vehicle), and reports the position on a map. However, such conventional approaches do not allow for control and general utilization of the position information.

Thus, there is a need for ways to utilize position information of mobile computing devices.

SUMMARY OF THE INVENTION

Broadly speaking, the invention relates to techniques for location tracking, location utilization, and dissemination and management of location information.

The invention can be implemented in numerous ways including, a method, system, device, and a computer readable medium. Several embodiments of the invention are discussed below.

As a location monitoring system, one embodiment of the invention includes at least: a plurality of mobile computing devices supported by a wireless network, each of the mobile computing devices being associated with and proximate to an object whose location is being monitored; and a web server coupled to a wired network that couples to the wireless network, the web server stores a plurality of locations of each of the mobile computing device and enables authorized users to access the locations of each of the mobile computing devices via the wired network.

As a method for monitoring position of objects, one embodiment of the invention includes at least the acts of: affixing a mobile computing device to an object to be monitored; periodically activating at least a portion of the mobile computing device to determine its location; subsequently transmitting the location to a web server through at least in part a wireless network; and displaying the location of the object to a monitoring party via the monitoring parties access to the web server.

As a method for monitoring position of a plurality of objects, each of the objects being or having a mobile computing device proximate thereto, one embodiment of the invention includes at least the acts of: obtaining locations for the mobile computing devices and thus the objects proximate thereto; receiving a request to view the location pertaining to a particular one or more of the objects; and delivering a response to the request, the response including the location pertaining to the particular one or more of the objects.

As a method for monitoring position of a plurality of objects, each of the objects being or having a mobile computing device proximate thereto, one embodiment of the invention includes at least the acts of: obtaining locations for the mobile computing devices and thus the objects proximate thereto; comparing the locations against at least one predetermined location criteria; and sending an electronic notification to a predetermined destination based on the comparing.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5A is a diagram of an exemplary authorization table in a location database;

FIG. 5B is a diagram of an exemplary location table in a location database;

DETAILED DESCRIPTION OF THE INVENTION

The invention pertains to techniques for location tracking, location utilization, and dissemination and management of location information.

Embodiments of this aspect of the invention are discussed below with reference to FIGS. 1-7B. However, those skilled in the art will readily appreciate that the detailed description given herein with respect to these figures is for explanatory purposes as the invention extends beyond these limited embodiments.

Figure 1:
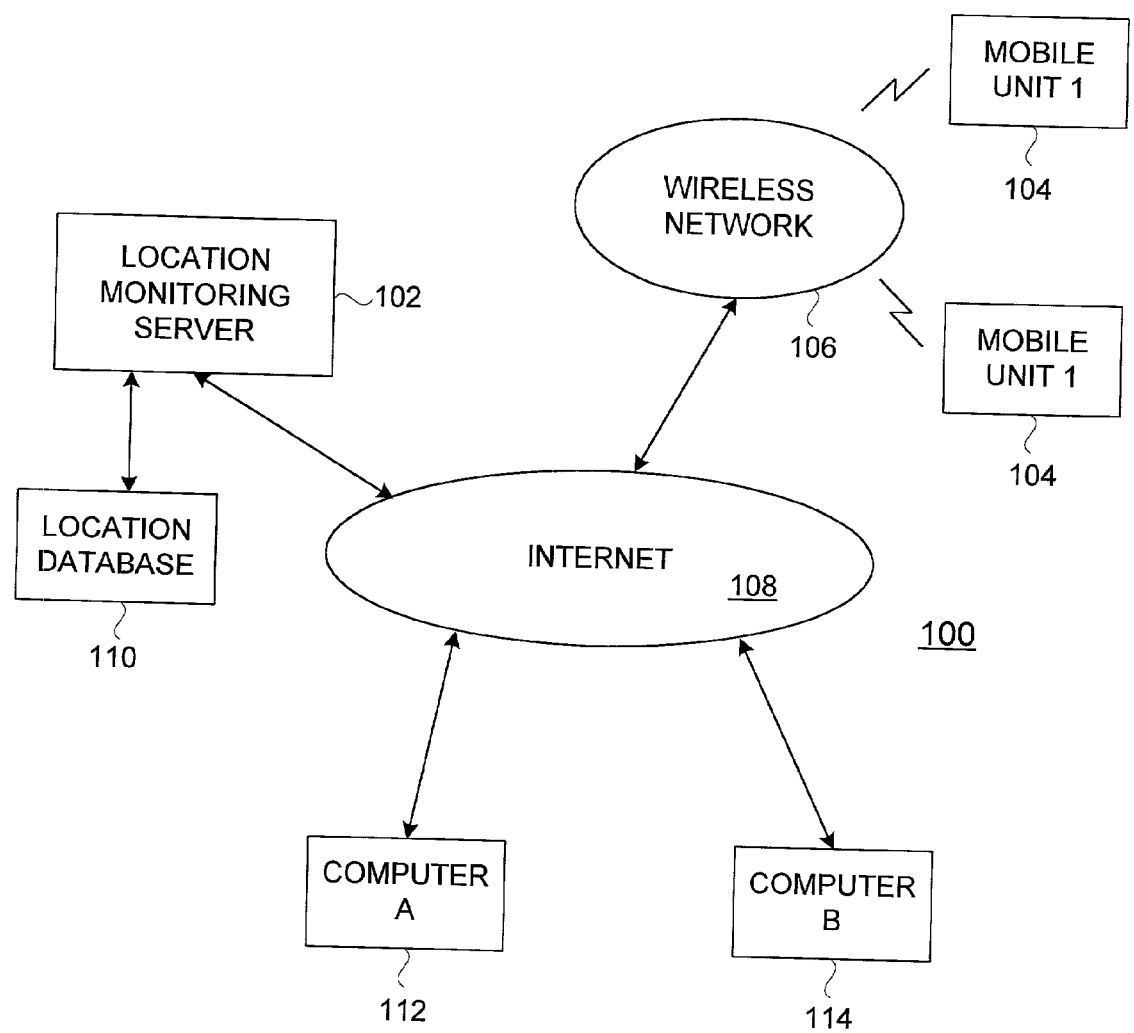
FIG. 1 is a block diagram of location monitoring system according to one embodiment of the invention.

FIG. 1 is a block diagram of location monitoring system 100 according to one embodiment of the invention. A location monitoring server 102 manages location information pertaining to a plurality of mobile units 104. The mobile units are typically attached to objects, such as people, vehicles, or containers. A wireless network 106 enables the mobile units 104 to communicate with the location monitor server 102. In one embodiment, the wireless network 106 couples to the Internet 108 (or other data network). The location monitoring server 102 also couples to the Internet 108. Location information associated with the mobile units 104 is thus able to be delivered to the location monitoring server 102 through the wireless network 106 and the Internet 108. A location database 110 coupled to the location monitoring server 102 can store the location information for the mobile units 104. The location monitoring server 102 is then able to utilize the location information by accessing the data stored in the location database 110. The location database 110 can reside on the location monitoring server or a separate local or remote computer.

The location monitoring system 100 can also include remote computers 112 and 114 that can couple to the Internet 108 through various means. Once coupled to the Internet 108, the remote computers 112 and 114 can access the location monitoring server 102 to receive location related services or to otherwise make use of the location information.

Each mobile unit can obtain location information on its location and forward the location information to the location monitoring server (web server). The location information can be forwarded to the location monitoring server by a variety of ways. One way is through use of a Short Message Service (SMS) message. The location information can also be obtained by a variety of methods. One method is to provide a Global Positioning Satellite (GPS) device within the mobile units. With GPS, the location information obtained can be distances to a plurality of global positioning satellites or can be a determined location from processing of the distances. When only the distances are provided, then the mobile unit merely sends the distances and need not perform processing to determine the location from the distances (instead a server can do so). Another method is to use location information obtained from a wireless network. With this method, the wireless network can provide location information on some or all of said mobile computing devices to the location monitoring server. In this case, the mobile units need not participate in obtaining the location information. As yet another method, a combination of these or other methods can be used to gather an accurate location for the mobile devices. For example, the location monitoring server could be provided with location information provided from the wireless network as well as location information provided by the mobile units themselves. By using the location information from both sources, more accurate and reliable location determination is able to be performed.

Figure 2:
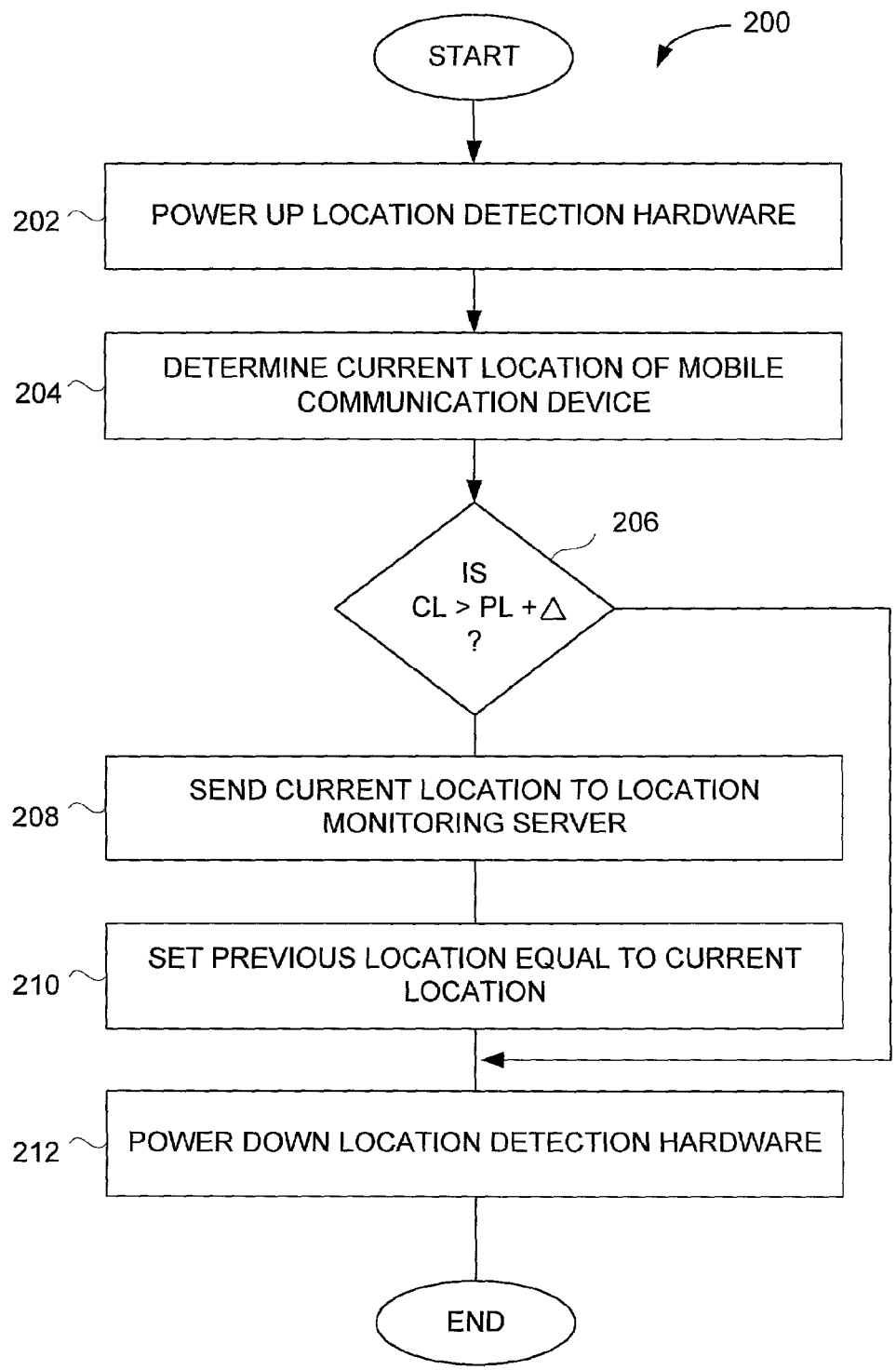
FIG. 2 is a flow diagram of client-side location processing according to one embodiment of the invention.

FIG. 2 is a flow diagram of client-side location processing 200 according to one embodiment of the invention. The client-side location processing 200 is performed on a client device, such as the mobile units 104 illustrated in FIG. 1.

The client-side location processing 200 initially powers-up 204 the location detection hardware within the client device. Next, the current location of the mobile communication device (client device) is determined 206. A decision 208 then determines whether the current location (CL) is greater than the previous location (PL) by more than a delta amount (Δ). When the decision 208 determines that the current location is not greater than the previous location by more than the delta amount, the current location is sent 208 to the location monitoring server. Here, the current location can be sent to the location monitoring server in a variety of different electronic ways. These ways include email, file transfer, etc. Then, the previous location is set 210 equal to the current location. Following the operation 210, as well as directly following the decision 208 when the current location does not exceed the previous location by more than the delta amount, the location detection hardware within the mobile communication devices is powered-down 212. Following the operation 212 the client-side location processing 200 is complete and ends.

According to this embodiment, the client device powers up to send its current location to a location monitoring server and then powers down to conserve power usage. In the embodiment shown in FIG. 2, the current location is sent to the location monitoring server only when it differs from the previous location by more than a predetermined amount. This conserves not only network bandwidth but also power usage at the client device.

Alternatively, the new location could be determined and/or sent only after a sensor internal to the client device (mobile unit) indicates that it has undergone significant movement since the previous location was obtained. A wide variety of sensors can be used. For example, motion sensors are readily available that indicate distances walked or run. Using such a sensor would reduce the frequency with which the new location should be determined and/or transmitted, thus saving network bandwidth and conserving power consumption. Such a motion sensor can be built into the client device, then if minimal motion detected, then no location detection need be triggered (or triggered less frequently). This provides automatic shut down of circuitry within the client device when the client device is not moving, in the evening (e.g., user sleeping), in a meeting, in one's office at work, etc.

As another alternative, invoking of the client-side location processing 200 can be performed periodically in accordance with a predetermined period. The predetermined period for the periodic location determination can vary with time of day and day of week. For example, the location determination can be made more frequently during the day and less frequently in the evening. As a further example, different predetermined period can be assigned for different days of the week.

As still another alternative, the client-side location processing 200 can be invoked only when a thermal sensor provided with the client device indicates that the mobile device is being worn by its user. Here, the thermal sensor could be utilized to effectively turn off the location monitoring or transmission circuitry and thus conserve power when the client device is not being worn by its user.

As yet still another alternative, the location monitoring server or some other server could send a request for location information to a client device and thus invoke the acquisition of the current location on the client device. In this regard, the request for the location information could be sent to the client devices only when such information is being remotely monitored by another. Such techniques would also facilitate conservation of power utilization on the client device as well as network bandwidth.

The determination of the location of the client device can thus be triggered or invoked by the client device itself or a location monitoring server (or other remote server) using any of a variety of ways (used separately or in combination). The location of the client device (mobile device) can be determined by the client device itself (e.g., using GPS), by a wireless network infrastructure, or through a combination of both.

Figure 3:
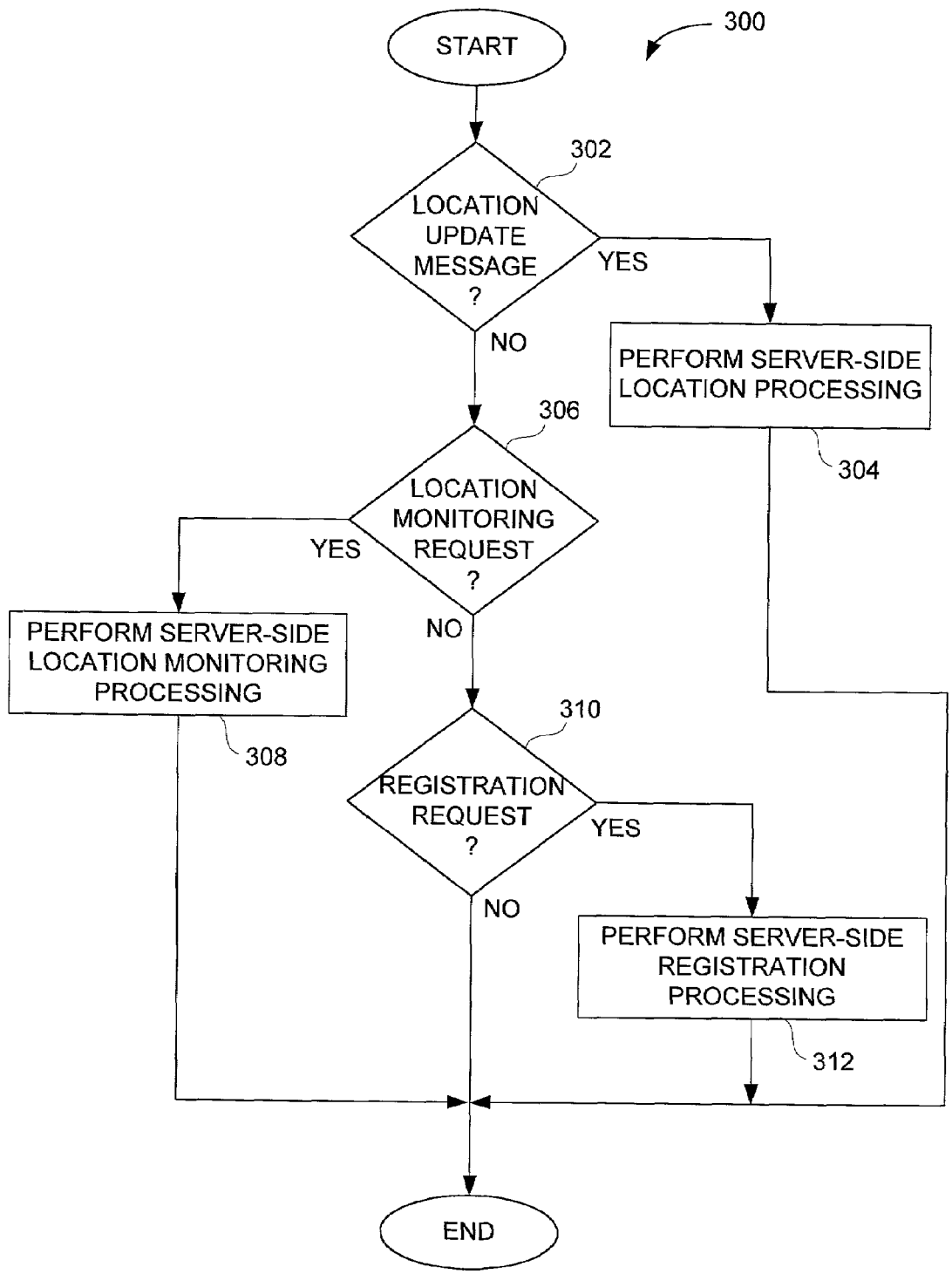
FIG. 3 is a flow diagram of server-side location management processing according to one embodiment of the invention.

FIG. 3 is a flow diagram of server-side location management processing 300 according to one embodiment of the invention. The server-side location management processing 300 begins with a decision 302 that determines whether a location update message has been received. Here, the location update message is a message being sent to the location monitoring server by a particular one of the mobile units.

When the decision 302 determines that a location update message has been received, then server-side location processing is performed 304. The server-side location processing is able to determine the location of the mobile unit (mobile communication device) and store the location into a location database, such as the location database 110 as illustrated in FIG. 1. Additionally, the server-side location processing can notify interested registered viewers. Additional information on the server-side location processing is discussed below with respect to FIG. 4.

On the other hand, when the decision 302 determines that a location update message has not been received, then a decision 306 determines whether a location monitoring request has been received. When the decision 306 determines that a location monitoring request has been received, server-side location monitoring processing is performed 308. As an example, a location monitoring request is received by remote computer, such as one of the computers 112 and 114 illustrated in FIG. 1. The server-side location monitoring processing is able to provide viewers (e.g., registered viewers at the remote computers) with location or position of the one or more mobile units (or associated objects) of interest. The server-side location monitoring processing is further discussed below with respect to FIG. 6.

Alternatively, when the decision 306 determines that a location monitoring request has not been received, then a decision 310 determines whether a registration request has been received. Typically, the registration request would be received at the location monitoring server and would have been sent by one of the remote computers 112 or 114 (or their users). In any case, when the decision determines that a registration request has been received, server-side registration processing is performed 312. The server-side registration processing generally operates to register a user, or the user's computer, for use with the location monitoring system such that location information is able to be accessed and viewed on the viewer's computer. In this regard, various features provide for the mobile users to control who is able to view their location, as well as to send alerts or notifications to authorized registered viewers when certain location-based events occur. Additional details on the server-side registration processing are discussed below with respect to FIGS. 7A and 7B.

Following the operations 304, 308 and 312, the server-side location management processing 300 is complete and ends. However, the server-side location management processing 300 is effectively invoked when an incoming message or request is received at the location monitoring server.

Although not shown in FIG. 3, when a location monitoring request is received from a monitoring party, prior to performing the server-side location monitoring processing, the monitoring party must login with an appropriate user name and/or password. This allows restricted access to the location information. In one embodiment, the users of the mobile units can control whether monitoring parties are given access to their location information by authorizing certain monitoring parties.

Figure 4:
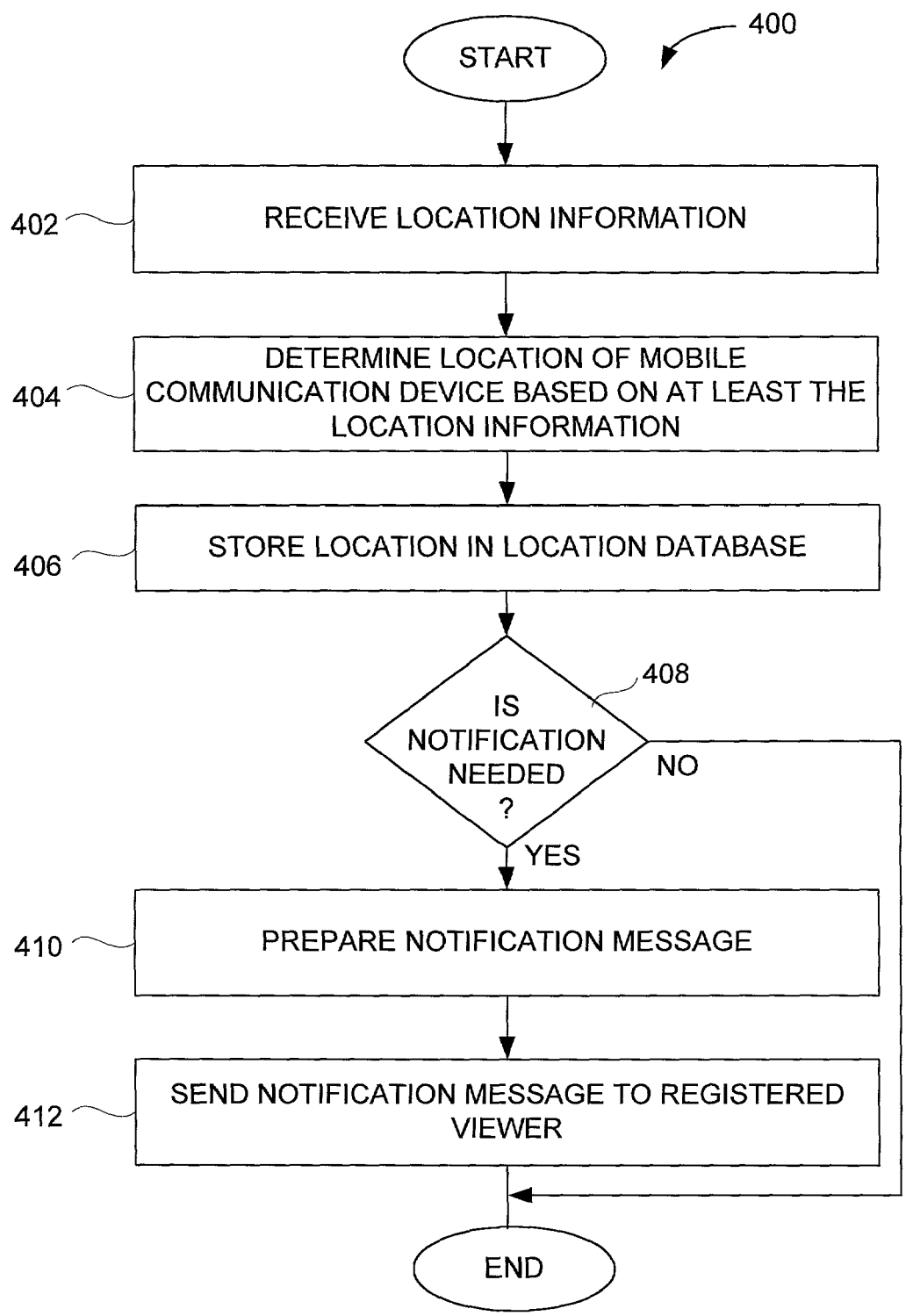
FIG. 4 is a flow diagram of server-side location processing according to one embodiment of the invention.

FIG. 4 is a flow diagram of server-side location processing 400 according to one embodiment of the invention.

The server-side location processing 400 is, for example, performed by a location monitoring server, such as the location monitoring server 102 illustrated in FIG. 1. The server-side location processing 400 initially receives 402 location information. Typically, the location information is received from a mobile communication device (mobile unit) and/or a carrier network (e.g., wireless network). Next, the location of the mobile communication device is determined 404 based on at least the location information. Here, the location information could itself be sufficient to enable the determination of the location of the mobile communication device. Alternatively, the location information could be combined with other information in order to determine the location of the mobile communication device (or to more accurately determine the location of the mobile communication device). In another embodiment, the location information could actually indicate the location. In any case, once the location of the mobile communication device has been determined 404, the location is stored 406 in a location database. As an example, the location database can be the location database 110 illustrated in FIG. 1.

Next, a decision 408 determines whether a notification is needed. Here, the server-side location processing 400 is able to send notifications to registered viewers as appropriate. The decision 408 determines whether a notification is needed to inform one or more registered viewers about the location information that has just been received and processed. Hence, when the decision 408 determines that a notification is needed, a notification message is prepared 410. Then, the notification message is send 412 to the one or more appropriate registered viewers. Following the operation 412, as well as directly following the decision 408 when no notifications are needed, the server-side location processing 400 is complete and ends.

As noted above, the server-side location processing 400 includes the decision 408 that determines whether any notification is needed. Here, based on the location of the mobile communication device, various notifications can be initiated. The various notifications can, for example, alert of a predetermined location, alert of an unauthorized region, alert of change in location, etc. The notification can be sent to the monitoring party through a email message (including two-way pager message), an instant response web-based message, through a web page provided at the mobile communication device, telephone message, and the like.

FIG. 5A is a diagram of an exemplary authorization table 500 in a location database. The exemplary authorization table 500 includes a row of information for each mobile device being monitored. Each row contains information on: mobile device identifier, user, supervisor (monitoring party), password, and whether logged in.

FIG. 5B is a diagram of an exemplary location table 550 in a location database. The exemplary location table 550 includes a row location information for each of the mobile devices being monitored. Each row contains information on: mobile device identifier, current location, and previous location. The location can include much more historical information to keep a log of the locations of the mobile device over an extended period of time (e.g., day, week, month, year).

Figure 6:
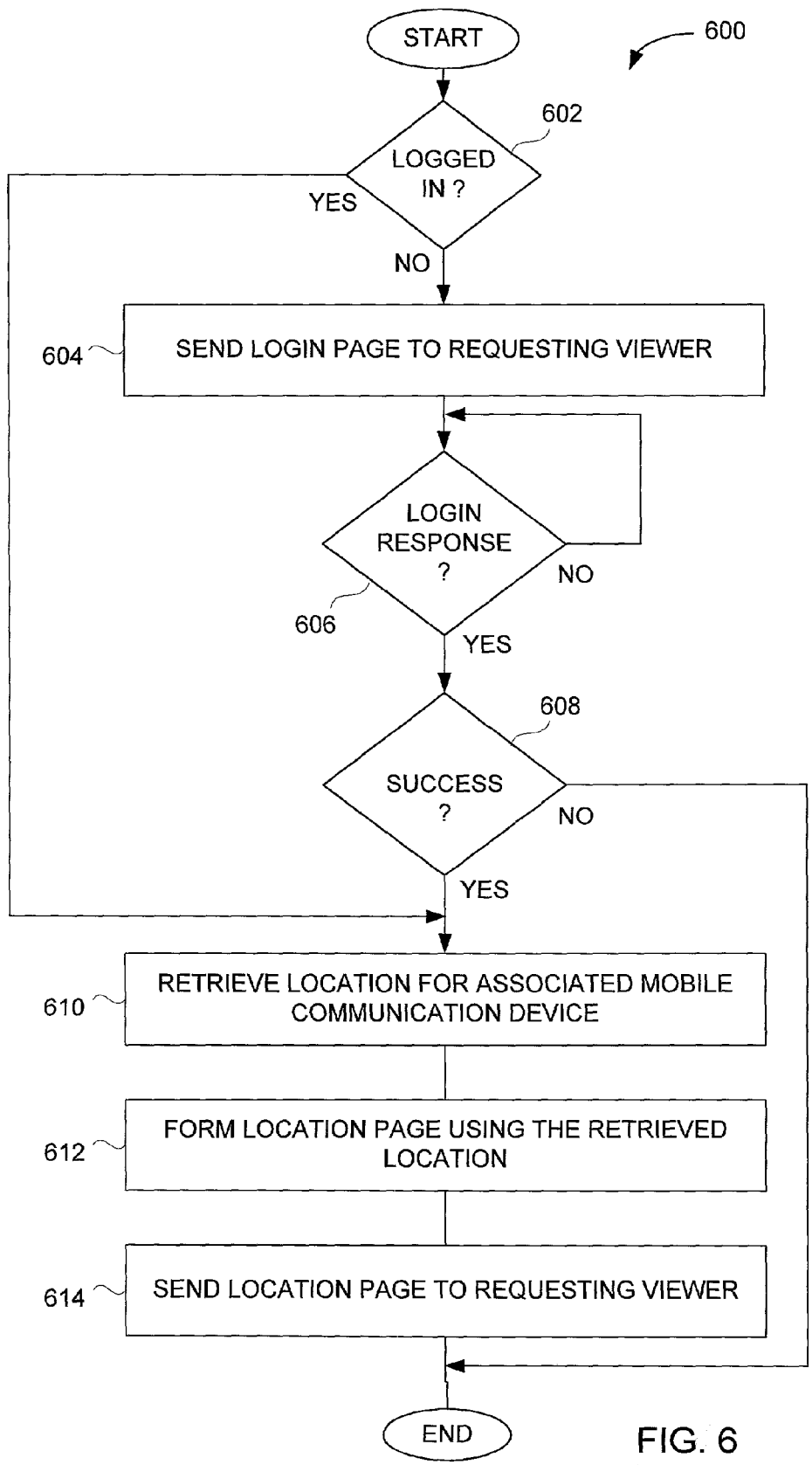
FIG. 6 is a flow diagram of server-side location monitoring processing.

FIG. 6 is a flow diagram of server-side location monitoring processing 600 according to one embodiment of the invention. The server-side location monitoring processing 600 begins with a decision 602 that determines whether a requesting viewer (monitoring party) has logged-in. Here, typically a request is received from a requesting viewing that seeks to either to log-in or to receive a location page. Hence, the decision 602 initially determines whether the requesting viewer is logged-in. When the decision 602 determines that the requesting viewer is not yet logged-in, then a log-in page is sent 604 to the requesting viewer. Then, a decision 606 waits for a log-in response. When the decision 606 determines that a log-in response has not yet been received, the server-side location monitoring processing 600 effectively awaits a log-in response (or a suitable time-out). Once the decision 606 determines that a log-in response has been received, then a decision 608 determines whether the log-in is successful. When the decision 608 determines that the log-in is not successful, then the server-side location monitoring processing 600 is complete and ends with the requesting viewer being denied access to the location related information. On the other hand, when the decision 608 determines that the log-in has been successful, as well as directly following the decision 602 when the requesting viewer is already logged-in, the location for the associated mobile communication device (mobile unit) is retrieved 610. As an example, the location can be retrieved from the location database 110 by the location monitoring server 102 illustrated in FIG. 1. Then, a location page using the retrieved information can be formed 612. Here, the location page represents the formatting of the location information into a suitable format, such as a document, that can be delivered to the requesting viewer. As an example, the location page can be a marked-up language document such as HTML, XML, HDML, or other markup language. The location page can also be customized for the type of computing device being utilized by the requesting viewer. Then, the location page is sent 614 to the requesting user. Following the operation 614, the server-side location monitoring processing 600 is complete and ends with the requesting viewer having received the requested location information.

Following successful login by a requesting viewer (monitoring party), the location for the mobile communication device that the requesting viewer has been authorized to receive is able to be retrieved. Then, the location is provided (i.e., sent) to the requesting viewer. In one embodiment, the location is part of a web page that is sent to the requesting viewer.

A server-side registration processing allows a viewer (requesting viewer) to request to view the location of a particular mobile communication device or it associated object. Access is denied if the viewer is not authorized. In one embodiment, the authorization can be controlled by the owner or user of the particular mobile communication device. The server-side registration processing also allows the viewer to set options. The options that can be set are numerous. Examples of the options include notifications or alerts, type of alert or notification (phone, pager, email, etc.), unauthorized or authorized locations, save history or not, labels for different locations (e.g., home, school, work, etc.). By saving the history (i.e., location history), the viewer is able to subsequently examine a history of movement. The history of movement can be presented to the viewer in textual or graphical formats.

Figure 7A:
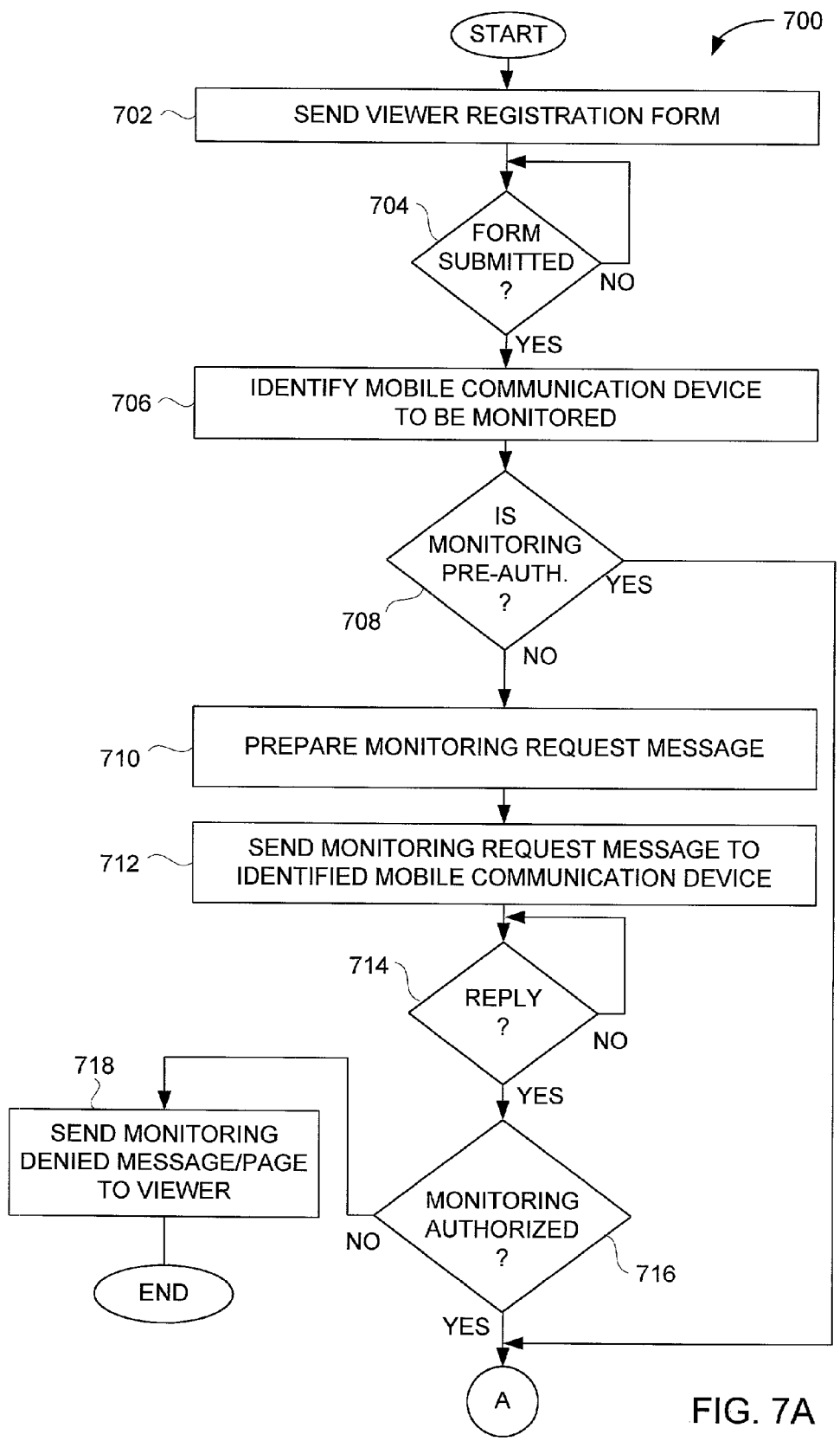
FIGS. 7A and 7B are flow diagrams of server-side registration processing.
Figure 7B:
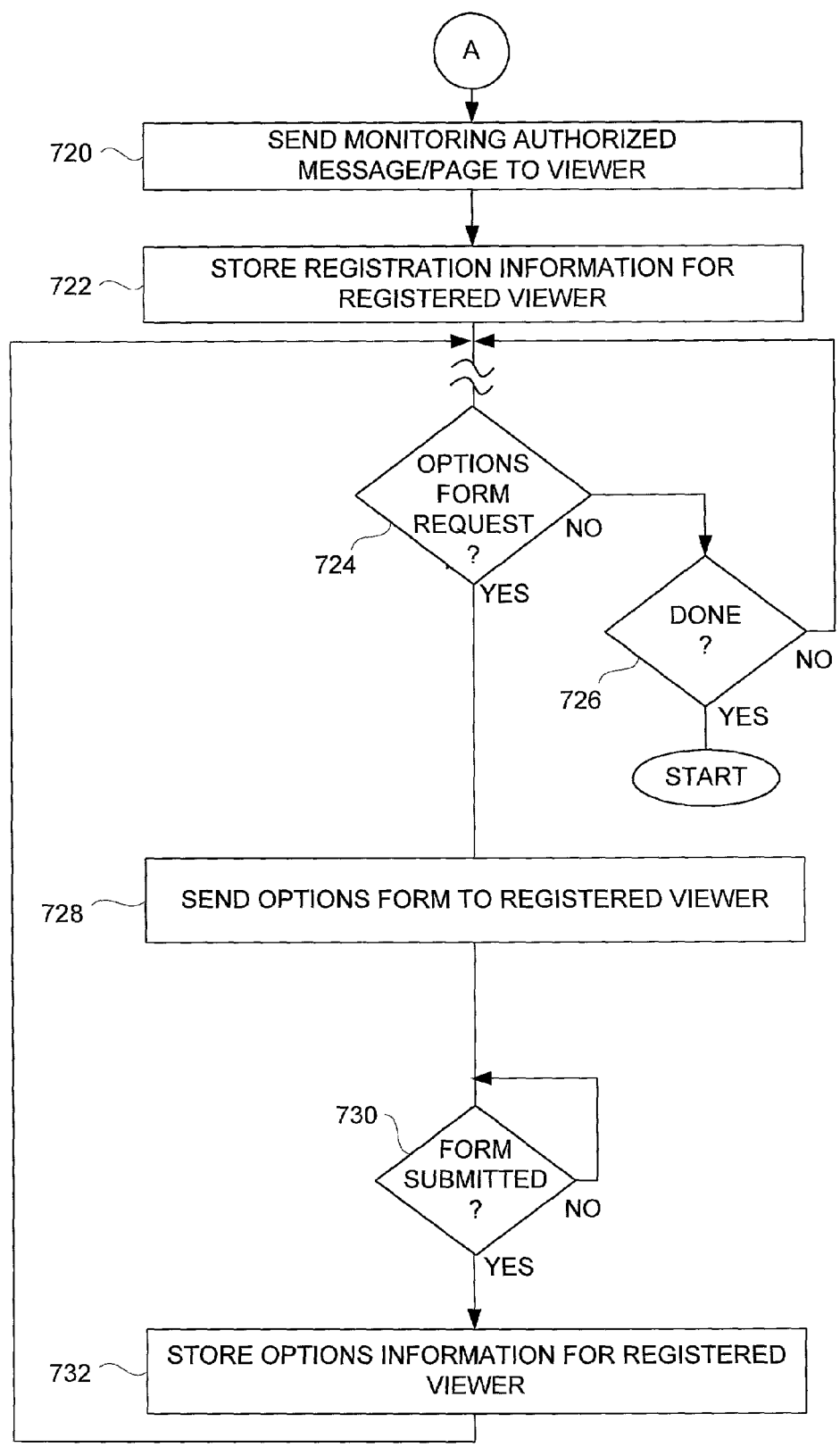

FIGS. 7A and 7B are flow diagrams of server-side registration processing 700 according to one embodiment of the invention. The server-side registration processing is, for example, performed by the location monitoring server 102 illustrated in FIG. 1.

The server-side registration processing 700 initially sends 702 a viewer registration form to a user attempting to register with the location monitoring server. As an example, the viewer registration form can be delivered to a computer associated with the user over the Internet and be displayed in a browser application associated with the user's computer. After the viewer registration form has been sent 702 to the viewer, a decision 704 determines whether the registration form has been submitted. Here, the server-side registration processing 700 is awaiting the return of the viewer registration form. When the decision 704 determines that the viewer registration form has not been returned, then the server-side registration processing 700 awaits its submission. On the other hand, when the decision 704 determines that the viewer registration form has been submitted (or times-out), then the mobile communication device to be monitored is identified 706. The mobile communication device to be monitored can be identified 706 from the information provided in the viewer registration form or from other information obtained from the viewer (e.g., from a separate page or form submitted by the viewer).

Next, a decision 708 determines whether monitoring of the particular mobile communication device has been pre-authorized. When the decision 708 determines that the monitoring for the particular mobile communication device has not been pre-authorized, then a monitoring request message is prepared 710. The monitoring request message is then sent 712 to the particular mobile communication device identified 706. At this point, the server-side registration processing 700 is effectively waiting for a reply from the particular mobile communication device or its user as to whether or not the requested monitoring is authorized. When a decision 714 receives a reply to the request for authorization, then a decision 716 determines whether the reply has authorized monitoring. When the decision 716 determines that monitoring has not been authorized (i.e., monitoring has been denied) then a monitoring denied message/page is sent 718 to the viewer. Thereafter, a server-side registration processing 700 is complete and ends.

Following the decision 716 when the monitoring has been authorized, as well as directly following the decision 708 when the monitoring has been pre-authorized, a monitoring authorized message/page is sent 720 to the viewer. The monitoring authorized message/page informs the viewer that the requested monitoring of the particular mobile communication device or its associated object has been approved. Then, registration information for the registered viewer is stored 722.

Thereafter, whenever a registered user desires to set options with respect to the manner in which they monitor location of mobile communication devices or its associated object, such registered viewers can complete and submit an options form. Hence, a decision 724 determines whether an options form request has been received. When the decision 724 determines that an options form request has not been received, then a decision 726 determines whether the server-side registration processing 700 is complete. When the decision 726 determines that the registration is complete (done), then the server-side registration processing 700 is complete and ends. On the other hand, when the decision 726 determines that the server-side registration processing 700 is not complete, then the server-side registration processing 700 returns to repeat the operations following the operation 722.

Alternatively, when the decision 724 determines that an options form request has been received, then an options form is sent 728 to the registered viewer. Then, a decision 730 determines whether the options form has been submitted. When the decision 730 determines that the options form has not yet been submitted, then the server-side registration processing 700 awaits submission of such a form. When a decision 730 determines that the options form has been submitted, then the options information provided by the options form is stored 732 for the registered viewer. Following the operation 732, the server-side registration processing 700 returns to repeat the operations following the operation 722.

It should be noted that the server-side registration processing 700 need not wait for the form submission at operations 704 or 730, or the reply message at operation 714, but can instead utilize a database or other data store to store state information such that the server-side registration processing 700 can proceed efficiently without being blocked or held-up while waiting for feedback from viewers or users of mobile communication devices. Such is well know in the programming fields, particularly with Internet programming.

Still further the invention is suitable for tracking delivery or maintenance personnel or vehicles. When a delivery or service appointment is made, you can receive a code for the truck or person that is going perform the delivery or service. Then, on the delivery day (days) when the truck or person is to deliver to or service one's home or business, an alert message or notification can be sent to the requestor (e.g., home owner or office manager). As examples, the message or notification is electronic and include a page, email or telephone type messages or notifications. Hence, if the homeowner is impatiently waiting for the delivery, they can access the location of the truck or person that is to perform the delivery or service. Still further, the requester may also obtain schedule information on the person or vehicle, and thus determine how many other are scheduled before you. The schedule could also be updated by the truck or person (or their business) to reflect an up-to-date version throughout their day. Hence, the requester is able to obtain additional information over the Internet without have to wait impatiently or having to phone the associated business for information.

The mobile unit (client device, mobile communications device or mobile computing device) is, for example, one of a pager, mobile phone, personal digital assistant, or reduced size portable computing device.

U.S. Pat. No. 5,959,557 is hereby incorporated herein by reference.

The invention can, at least partly, be embodied as computer readable program code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable program code is stored and executed in a distributed fashion.

The advantages of the invention are numerous. Different embodiments or implementations may yield one or more of the following advantages. One advantage of the invention is that location of objects can be tracked via the Internet. Another advantage of the invention is that objects, such as persons, can control the dissemination of their location information. Another advantage of the invention is that alerts or notification can be triggered based on locations of objects. Another advantage of the invention is that mobile computing devices providing location monitoring capabilities are small (e.g., wearable) and offer low power consumption (e.g., long battery life). Another advantage of the invention is that embodiments can operate without user input or actions.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A location monitoring system, comprising:
a plurality of mobile computing devices supported by a wireless network, each of said mobile computing devices being associated with and proximate to a corresponding object; and
a web server operatively connectable to the wireless network, said web server storing locations of each of said mobile computing devices, and said web server enabling authorized users to access the locations of said mobile computing devices via the Internet,
wherein access to locations of each of said mobile computing devices is controlled by the owner or user of the corresponding mobile computing device,
wherein the authorized users do not have to be proximate to the objects whose locations they are authorized to access,
wherein said web server determines whether an electronic mail or instant message notification is to be sent to an authorized user based on the location of at least one of the mobile computing devices corresponding to an object,
wherein said web server sends an electronic mail or instant message notification to the authorized user when it has been determined that an electronic mail or instant message notification is to be sent to the authorized user,
wherein one or more notification locations are defined by the authorized user through interaction with said web server, and wherein the one or more notification locations that have been defined are assigned location labels by the authorized user through interaction with the web server, wherein the location labels assigned by the authorized user are personal to the authorized user and not used with other users, and
wherein said web server determines whether the location of the mobile computing device corresponding to the object is at one of the one or more notification locations, and generates a notification when it is determined that the location of the mobile computing device is at one of the notification locations, and sends the notification to the authorized user.

2. A location monitoring system as recited in claim 1, wherein each of said mobile computing devices operates to obtain location information of its location and to forward the location information to said web server.

3. A location monitoring system as recited in claim 1, wherein the object is a person, a vehicle or a package, and
wherein the location of each of said mobile computing devices is reacquired based on an attribute related to the corresponding mobile computing device or related to the surroundings of the corresponding mobile computing device.

4. A location monitoring ByStem as recited in claim 1,
wherein at least one object whose location is being monitored is a package,
wherein an authorized user requests that said web server specify the location of the package,
wherein, when an authorized user requests that said web server specify the location of the package, said web server provides a response to the authorized user, the response including the location of the package based on the location of the corresponding one of said mobile computing devices, and the response also including information related to when the package is expected to reach its predetermined destination, and
wherein an electronic message is transmitted to the authorized user regarding the delivery of the package independent of any request from the authorized user.

5. A location monitoring system as recited in claim 1,
wherein each of the authorized users must be registered with said web server before the user is authorized to access the location of one or more of said mobile computing devices, wherein at least one attribute of the notification can depend on information provided by the authorized user during the registration of the user, and wherein the at least one attribute of the notification provided by the authorized user during registration includes a type of notification and how often notification is to be provided.

6. A method for monitoring position of objects, each object having a mobile computing device provided therewith, the mobile computing devices capable of communicating over a wireless network, said method comprising:

receiving a location of an object at a web server through the wireless network, the location being determined using the mobile computing device corresponding to the object; and displaying the location of the object to a monitoring party via accessing the web server through the internet, wherein the monitoring party does not have to be proximate to the object, wherein before the location is displayed to the monitoring party, the monitoring party has to be authorized, wherein, for privacy reasons, access to locations of each of the mobile computing devices is controlled by the owner or user of the corresponding mobile computing device, wherein the web server determines whether a notification is to be sent to an authorized party based on the location of the mobile computing device corresponding to the object, wherein said web server sends a notification to the authorized party when it has been determined that a notification is to be sent to the authorized party, wherein one or more notification locations are defined by the monitoring party through interaction with the web server, and wherein the one or more notification locations that have been defined are assigned location labels by the monitoring party through interaction with the web server, and wherein said method comprises:
determining whether the location of the mobile computing device corresponding to the object is at one of the one or more notification locations;
generating a notification when said determining determines that the location of the mobile computing device corresponding to the object is at one of the notification locations; and
sending the notification to the authorized party.

7. A method as recited in claim 6,
wherein said receiving operates to receive a location of the object that is transmitted by the mobile computing device, and
wherein said receiving of the location is not performed when the mobile computing device locally determines that its current location is substantially the same as its last determined location.

8. A method as recited in claim 6, wherein the period by which said receiving operates to receive the location varies and is dependent on a sensor within the mobile computing device that indicates lack of motion or not being worn.

9. A method as recited in claim 6, wherein said receiving is repeated as needed to determine the current location based on a detector detecting an attribute of the object.

10. A method as recited in claim 6, wherein said receiving depends on an attribute related to the mobile computing device or related to the surroundings of the mobile computing device so that said receiving is not receiving the location of the object at a fixed period, so power is able to conserved.

11. A method as recited in claim 6, wherein the object is a person, and wherein at least one of the one or more notification locations pertains to an unauthorized location, and wherein said method further comprises:
generating and transmitting a message to the mobile computing device advising the person that the person is in an unauthorized area.

12. A method as recited in claim 6, wherein the notification being sent is an electronic mail or instant message.

13. A method as recited in claim 6, wherein the object is a person.

14. A method as recited in claim 6, wherein the period by which said receiving operates to receive the location is in accordance with a schedule, the schedule utilizing a plurality of different periods by which the location is acquired.

15. A method as recited in claim 14, wherein the schedule depends on the hour of day or the day of week.

16. A computer readable medium including at least executable computer program code tangibly stored thereon for monitoring position of objects, each object having a mobile electronic device corresponding thereto, the mobile electronic devices capable of communicating in a wireless manner, said computer readable medium comprising:

computer program code for receiving a location of an object at a server via a wireless network, the location being determined using the mobile electronic device corresponding to the object; and computer program code for determining whether the location of the mobile electronic device corresponding to the object is at one of one or more notification locations;

computer program code for determining whether a notification is to be sent to an authorized party based on the location of the mobile electronic device corresponding to the object being at one of one or more notification locations;

computer program code for generating the notification when it is determined that a notification is to be sent to the authorized party; and computer program code for sending the notification to the authorized party when it has been determined that a notification is to be sent to the authorized party, wherein, for privacy reasons, access to locations of each of the mobile electronic devices is controlled by the owner or user of the corresponding mobile electronic device, and wherein one or more notification locations are defined by an interested party through interaction with the server, and wherein the one or more notification locations that have been defined are assigned location labels by the interested party through interaction with the server.

17. A computer readable medium as recited in claim 16, wherein said computer readable medium further comprises:
computer program code for displaying the location of the object to the authorized party via accessing the server through the Internet,
wherein the authorized party does not have to be proximate to the object.

18. A computer readable medium as recited in claim 16, wherein the location of each of the mobile electronic devices is reacquired based on an attribute related to the corresponding mobile electronic device or related to the surroundings of the corresponding mobile electronic device.

19. A computer readable medium as recited in claim 16, wherein the object is a package.

20. A computer readable medium as recited in claim 16, wherein the object is a person.

* * * * *

UNITED STATES PATENT AND TRADEMARK OFFICE
CERTIFICATE OF CORRECTION

| | |
|---|---|
| PATENT NO. | : 7,366,522 B2 |
| APPLICATION NO. | : 09/797517 |
| DATED | : April 29, 2008 |
| INVENTOR(S) | : Thomas et al. |

Page 1 of 1

It is certified that error appears in the above-identified patent and that said Letters Patent is hereby corrected as shown below:

IN THE CLAIMS:

Column 10, line 47, claim 4 "ByStem" should be --system--.

Column 11, line 16, claim 6 "internet" should be --Internet--.

TITLE PAGE ITEM [56], page 3, line 15,

"WO 98/07169 A1 1/1998" should be --WO 98/01769 1/1998--.

Signed and Sealed this

Twenty-fifth Day of August, 2009

David J. Kappos
*Director of the United States Patent and Trademark Office*